United States Patent

Rutter

[11] Patent Number: 6,007,253
[45] Date of Patent: Dec. 28, 1999

[54] SYSTEM FOR MOUNTING A WHEEL HUB BEARING UNIT TO A MOTOR VEHICLE SUSPENSION STANDARD

[75] Inventor: Andreas Rutter, Pinerolo, Italy

[73] Assignee: SKF Industrie S.p.A., Turin, Italy

[21] Appl. No.: 08/994,859

[22] Filed: Dec. 19, 1997

[30] Foreign Application Priority Data

Jan. 3, 1997 [IT] Italy ................................. 97A000003

[51] Int. Cl.[6] ...................................................... F16C 43/00
[52] U.S. Cl. ........................ 384/539; 384/544; 384/561; 384/585; 384/903
[58] Field of Search ..................................... 384/539, 544, 384/559, 561, 569, 570, 584, 585, 903; 411/353, 517, 518, 519

[56] References Cited

U.S. PATENT DOCUMENTS 4,236,767 12/1980 Feldle .
4,364,615 12/1982 Euler .
5,564,838 10/1996 Caillault et al. .

FOREIGN PATENT DOCUMENTS 0234787 9/1987 European Pat. Off. .
2160935 1/1986 United Kingdom .

*Primary Examiner*—Thomas R. Hannon
*Attorney, Agent, or Firm*—Bachman & LaPointe, P.C.

[57] ABSTRACT

There is disclosed a system for mounting a wheel hub bearing unit into a cylindrical seat (11) obtained in the suspension standard (12) of a vehicle. An axially outer circumferential groove (16) is obtained in the cylindrical seat (11). Proximate to the axially outer side (10*a*) of the outer race (10) of the bearing there is provided an elastic insert(15) of annular shape having a radial portion (15*a*) adjacent to said tace (10*a*) and constituting an axial stopping means for the outer race of the bearing. Elastically flexible portions (15*b*) are radially protruding from the outer surface or the bearing and are adapted to elastically bend and snap fit into said qroove (16) when the insert (15) is pushed axially into the cylindrical seat (11) of the suspension standard (12).

17 Claims, 6 Drawing Sheets

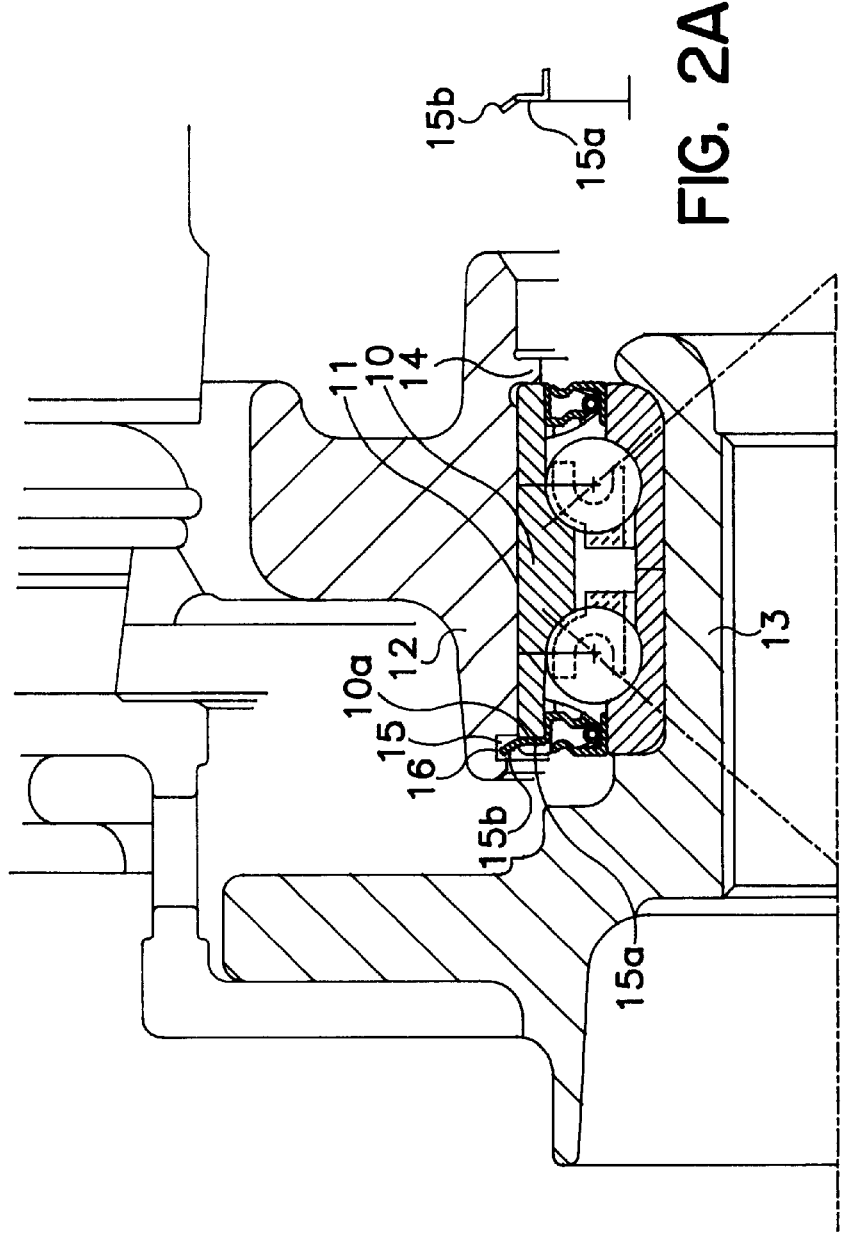
FIG. 2
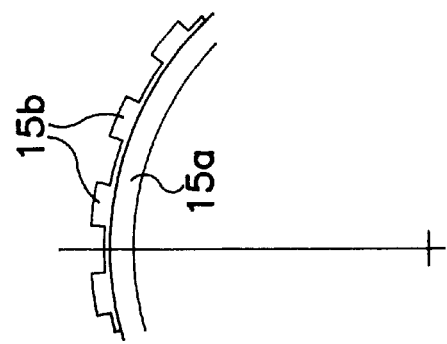
FIG. 2A
FIG. 2B

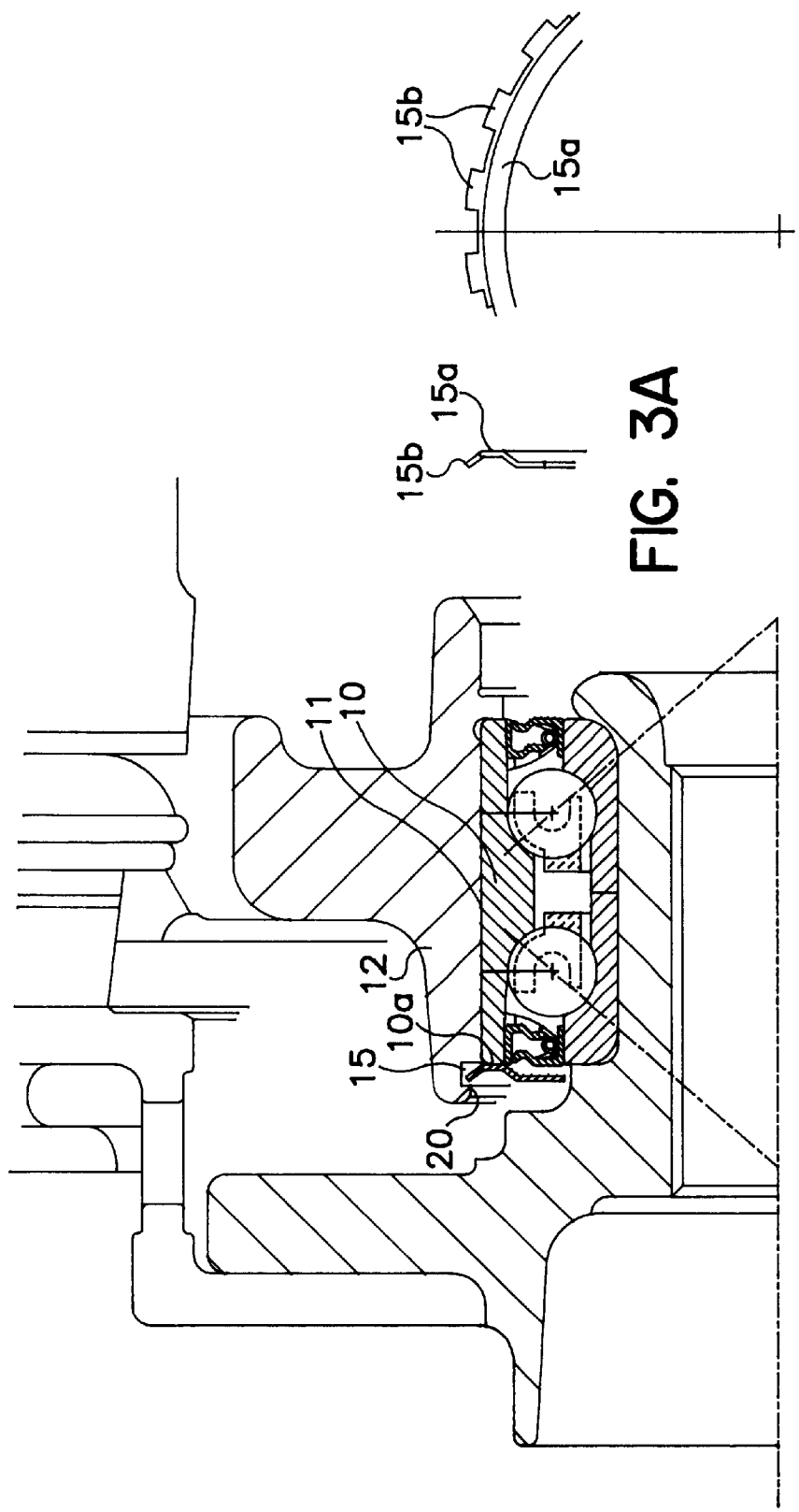

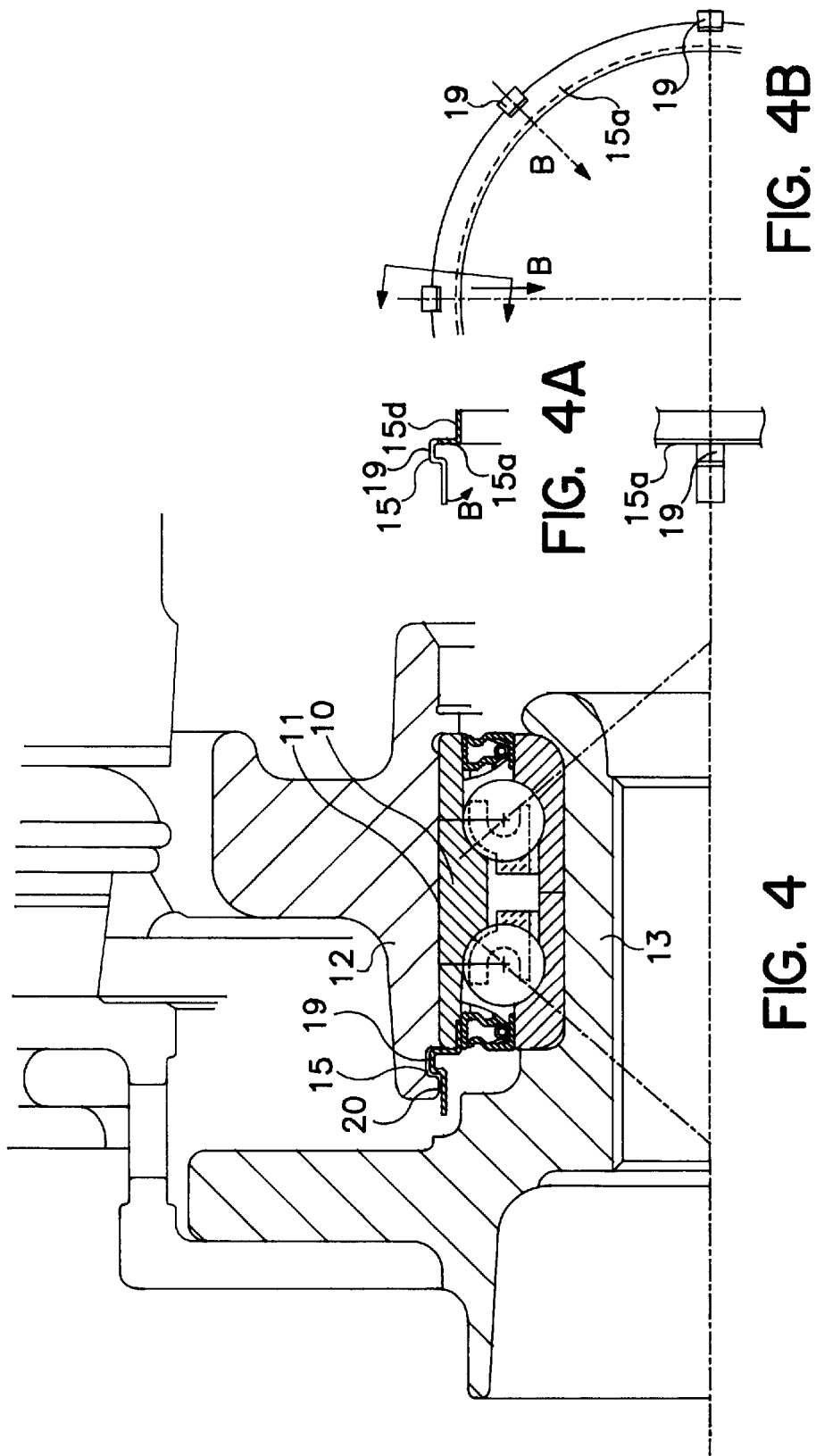

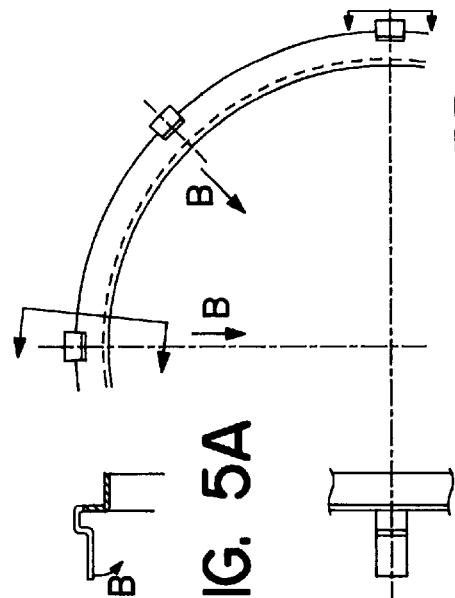
FIG. 5B
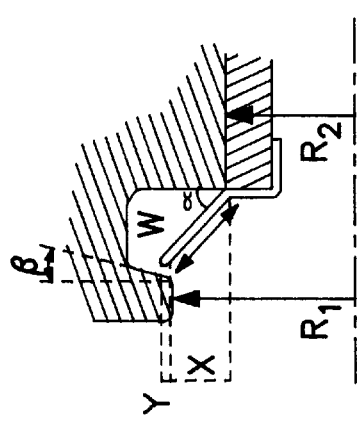
FIG. 6
FIG. 5A
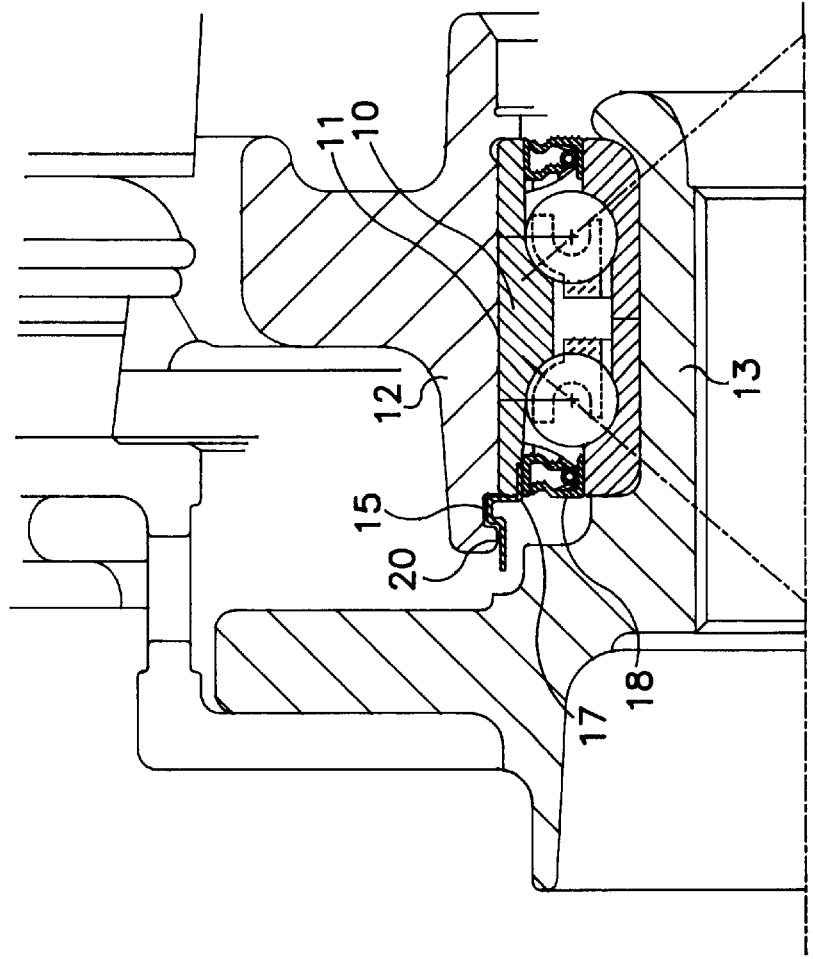
FIG. 5

SYSTEM FOR MOUNTING A WHEEL HUB BEARING UNIT TO A MOTOR VEHICLE SUSPENSION STANDARD

DESCRIPTION

FIELD OF THE INVENTION

The present invention generally relates to the fixation of a wheel hub bearing unit to the suspension standard of a motor vehicle. More particularly, the invention relates to a system for fixing the outer race of a bearing already pre-assembled to the wheel hub onto the vehicle suspension standard.

BACKGROUND OF THE INVENTION

The bearing of a wheel hub, particularly the outer race of the bearing must be axially restrained to the vehicle suspension standard or knuckle, to avoid the risk of the bearing coming off under the effect of axial loads acting on the bearing during operation.

At present there are known several fixing systems, adapted for different arrangements.

According to a first known system, firstly the bearing is fitted into a corresponding circular seat obtained in the knuckle and pushed against an axially inner shoulder. Secondly, a seeger ring is snap fitted in a circumferential groove at the entrance of the circular seat so as to axially retain the outer race of the bearing. Then, the wheel hub is inserted through the inner race of the bearing and secured in known manner to the constant velocity joint.

In other cases, it is preferred to firstly pre-assemble the bearing to the wheel hub and then insert and fix such a unit to the knuckle. When this route is followed, then it is not possible or practical to fit a seeger to stop axial movement of the bearing because the pre-assembled hub would render this operation difficult. Generally, the outer race of the bearing is forcefully fitted into the knuckle with some interference. However, this provision can not prevent the bearing from slipping outwardly under the action of loads exceeding a certain threshold.

SUMMARY OF THE INVENTION

It is an object of this invention to provide a mounting system which allows to prevent the outer race of the bearing from coming off of the knuckle where it is not possible nor expedient to mount a conventional stoppily seeger ring.

It is another object of the present invention to render the mounting of a wheel hub bearing unit easier.

In accordance with one aspect of the invention as claimed, these objects are accomplished by the provision of a system for mounting a wheel hub bearing unit into a cylindrical seat obtained in the suspension standard of a vehicle, wherein an axially outer circumferential groove is obtained in said cylindrical seat; and proximate to the axially outer side of the outer race of the bearing there is provided an elastic insert of substantially annular shape having at least a radial portion adjacent to said face and constituting an axial stopping means for said outer race of the bearing and at least an elastically flexible portion radially protuding from the outer surface of the bearing and adapted be elastically bend and snap fit into said groove when pushing the insert axially into said seat of the suspension standard.

Preferably, the diameter of the edge at the entrance of said seat is greater than the diameter of the cylindrical portion of said seat, the difference between said diameters being suitably chosen so as to allow for said elastic insert to snap fit into said groove by applying a controlled axially directed biasing force.

BRIEF DESCRIPTION OF THE DRAWINGS

In order that the present invention may be well understood there will now be described a few preferred embodiment thereof, given by way of example, reference being made to the accompanying drawings, in which:

FIGS. 1A and 1B are a partial axial cross-sectional view of a hub bearing unit mounted in accordance with the present invention and a cross-sectional view and a front view, of an element of FIG. 1 shown in isolation, respectively;

FIGS. 2, 2A and 2B are views similar to FIGS. 1, 1A and 1B, respectively, of a second embodiment of the invention;

FIGS. 3, 3A and 3B are views similar to FIGS. 1, 1A and 1B, respectively, of a third embodiment of the invention;

FIGS. 4, 4A and 4B are views similar to FIGS. 1, 1A and 1B, respectively, of a fourth embodiment of the invention;

FIGS. 5, 5A and 5B are views similar to FIGS. 1, 1A and 1B, respectively, of a fifth embodiment of the invention;

FIG. 6 schematically depicts some geometrical details of the locking member.

Figure 1:
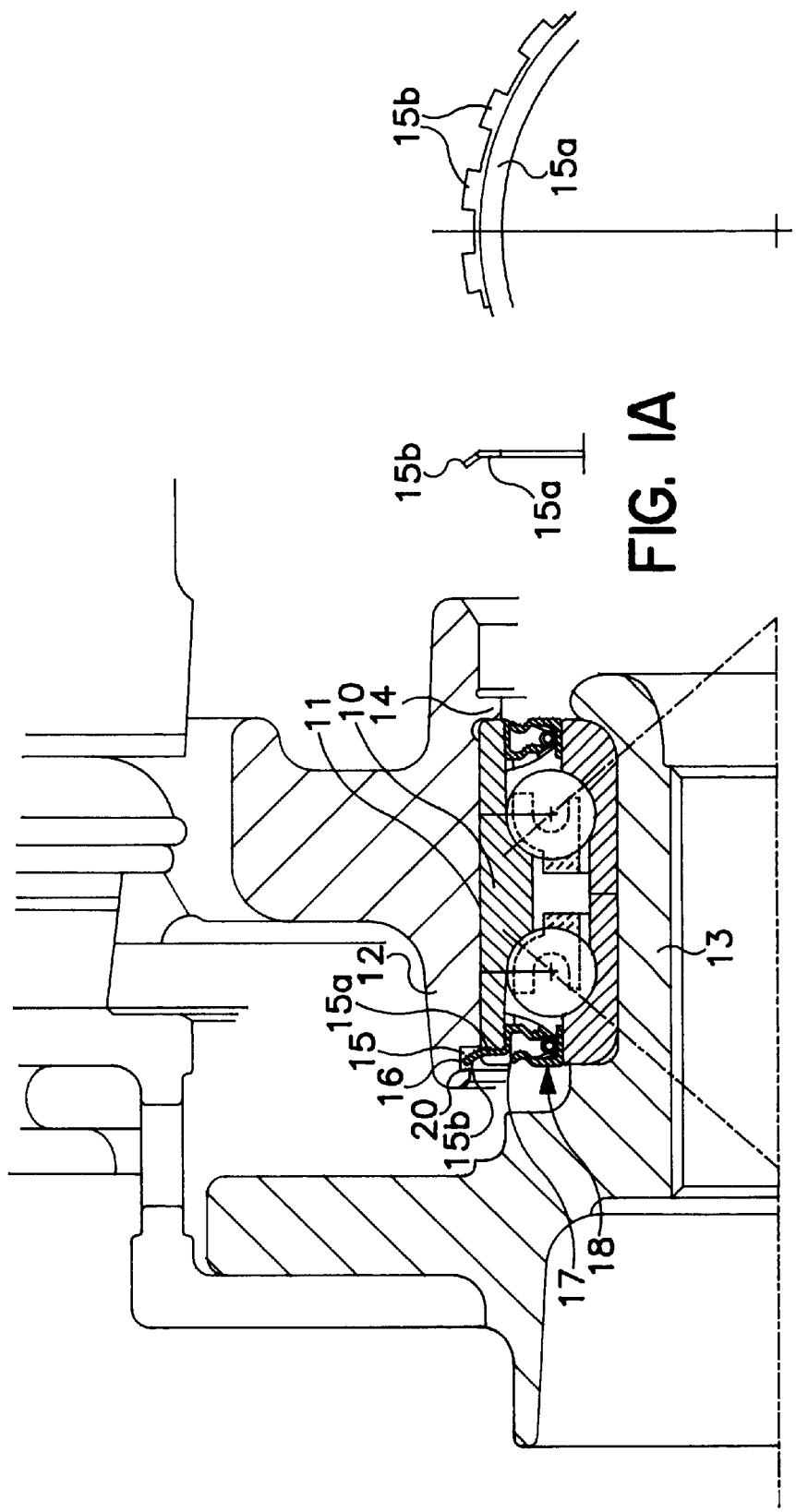
FIG. 1 is an axial cross-sectional view of a wheel hub bearing unit. mounted to the suspension standard in accordance with the present invention.

DESCRIPTION OF THE PREFERRED EMBODIMENT with reference initially to FIG. 1, numeral 10 designates the outer, non-rotating race a bearing for the wheel hub of a motor vehicle. The cylindrical seat in which the bearing is fixed is a circular opening 11 of the vehicle suspension standard or knuckle. The bearing is inserted in seat 11 after being assembled on the wheel hub 13 and is pushed against an axially inner shoulder of the knuckle.

According to the present invention, an elastic annular insert 15 is provided adjacent to the axially outer front face 10a of the outer race 10. Elastic annular insert 15 protrudes radially from the outer diameter of race 10 and snap fits into a circumferential groove 16 obtained at the entrance of cylindrical Seat 11. Particularly, groove 16 is obtained proximate to the position of face 10a when the bearing is mounted. As shown in FIG. 1A, in a first embodiment or this invention, the annular insert 15 comprises a first, radially inner radial portion 15a adjacent to the front face 10a of the outer race 10, and a second, radially outer portion 15b of truncated cone shape diverging towards the outside of the bearing.

The elastic insert 15 and the geometry of cylindrical seat 11 are suitably sized so as to force insert 15 to elastically bend and snap-fit into groove 16 when pushed axially in the direction of arrow A during assembly and so withstand axial forces acting in the opposite direction during operation and tending to push the bearing out of the suspension standard. As shown in further detail in the example of FIG. 6, the radius $r_1$ of edge 20 at the entrance of seat 11 in, which the bearing is fitted can be larger than the radius $r_2$ of the cylindrical main portion of aperture 11 so as not to force insert 15 to deflect excessively in overcoming edge 20 before it snap fits into groove 16. The difference $x=r_1-r_2$ is appropriately selected so as to allow snap fitting upon applying a controlled mounting thrust to the insert. Similarly, the length of the insert is dimensioned such that in the mounted position the radial difference y between the free end 15c of the insert and the edge 20 at the entrance of aperture 11 is sufficient to prevent axial outward displacement of the bearing in operation.

As shown in FIG. 1B, the radially outer portion 15b of the insert is preferably comprised of a plurality of radial elastic tongues 19, the circumferential extent of which is appropriately chosen for defining the mounting force to be applied to bend the tongues when mounting the insert.

FIGS. 1 to 6 chow several alternative embodiments of the annular insert in accordance with this invention.

In FIG. 1, the insert 15 is locked against the axially outer face 10a of the non-rotating outer race 10 by means of a sealing annular insert 17 being part of the sealing device 18 closing either side of the bearing.

FIG. 2 illustrates a variant embodiment of FIG. 1. In this variant, the annular insert is integral with the sealing device.

FIG. 3 depicts a further embodiment according to which insert 15 is a separate element not secured to the bearing but still adjacent to the outer side 10a of the non rotating outer race 10. In this variant arrangement, insert 15 may alternatively be so sized as to leave a certain axial play between race 10 and the knuckle 12 or be elastically axially compressed to some degree between these two bodies so as to exert a constant, inwardly directed axial biasing action pushing the bearing race 10 towards the knuckle (to the right in FIG. 3).

FIGS. 4, 4A and 4B show a further variant wherein insert 15 comprises a radially inner portion 15a adjacent to the outer face 10a of the bearing and a plurality of equally spaced elastic tongues 19 having a form which copies that of groove 16, in this example rectangular. Elastic tongues 19 protrude axially from the suspension knuckle 12 so as to allow for the insert to he easily removed from the bearing by pressing the tongues together as indicated by arrows B. in the variant of FIG. 4, the annular insert 15 has a cylindrical mounting portion 15d to be mounted directly to the bearing race 10.

FIGS. 5, 5A, 5B show a still further variant with respect to FIG. 4. In this further embodiment, the insert 15 is fastened to the bearing outer race 10 by means of insert 17 of the sealing device 18.

While specific embodiments of the invention have been disclosed, it is to be understood that such disclosure has been merely for the purpose of illustration and that the invention is not to he limited in any manner thereby. Various modifications will be apparent to those skilled in the art in view of the foregoing example. Particularly, with reference to FIG. 6. the thickness w of the insert, the length l of its free deflecting portion, the radius difference x between the edge at entrance of the aperture and the seat itself, the radial interference y and the angle α of conical tongues 15b and the angle β of the groove side face engaging the elastic insert are all designed as a function of the mounting force and the resistance to axially displacing thrusts to be attained. Preferably, the elastic annular insert 15 is of spring steel, or a material giving the insert the hardness and yield strength sufficient to contrast displacement of the bearing when this undergoes axial loads in operation.

Figure 7:
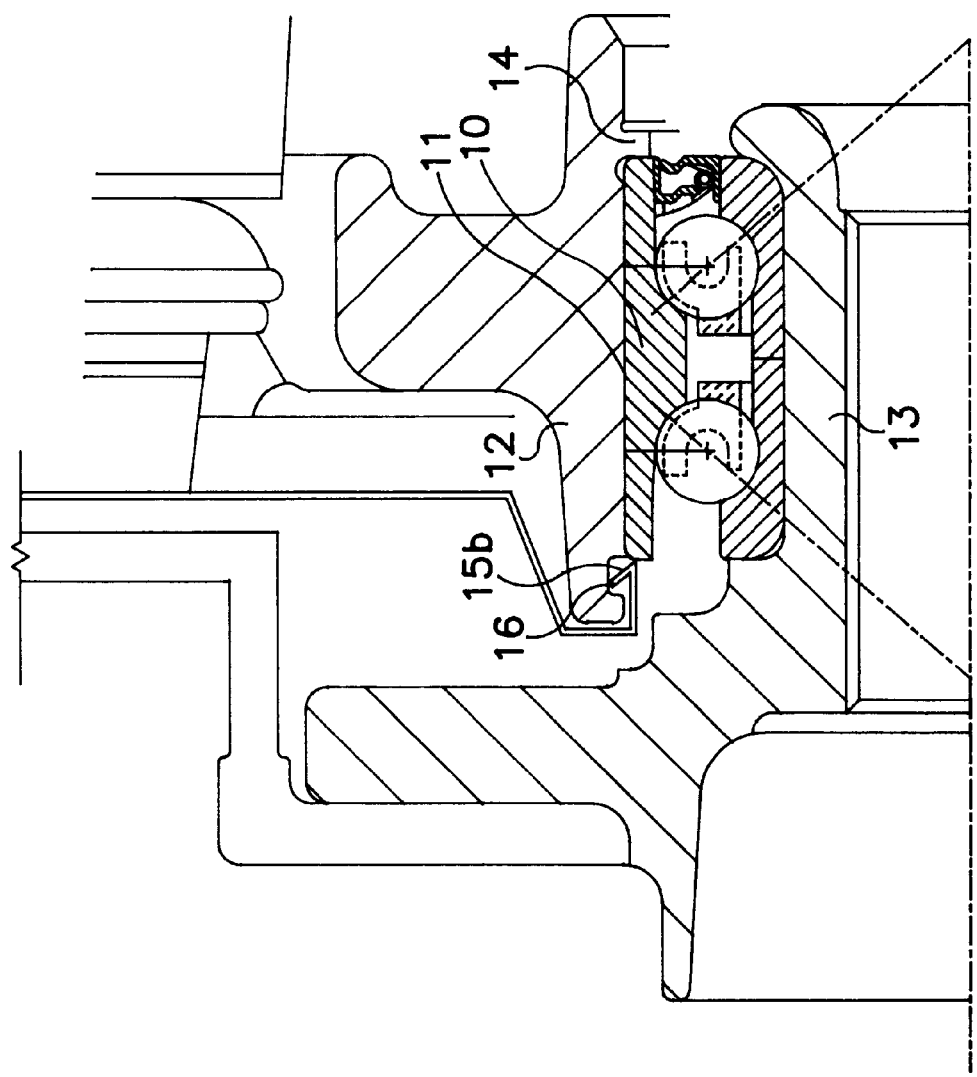
FIG. 7 is a partial axial cross sectional view schematically illustrating a further embodiment of the present invention.

Finally, with reference to FIG. 7, a further embodiment of the present invention provides that the elastic insert 15 is formed integrally with a disc-like brake cover 21 for protecting the brake 22.

I claim:

1. A system for mounting a wheel hub bearing unit into a cylindrical seat (11) obtained in the suspension standard (12) of a vehicle, wherein an axially outer circumferential groove (16) is obtained in said cylindrical seat (11), and proximate to the axially outer side (10a) of the outer race (10) of the bearing there is provided an elastic insert (15) of substantially annular shape having at least a radial portion (15a) adjacent to said face (10a) and constituting an axial stopping means for said outer race of the bearing, wherein said insert (15) is fixed to said outer face (10a) of the outer race (10) of the bearing; and at least an elastically flexible portion (15b) radially protruding from the outer surface of the bearing and adapted to elastically bend and snap fit into said groove (16) when pushing the insert (15) axially into said seat (11) of the suspension standard (12).

2. A mounting system as set forth in claim 1, wherein the radius ($r_1$) of the edge (20) at the entrance of said seat (11) is greater than the radius ($r_2$) of the cylindrical portion of said seat, the difference (x) between said radius ($r_1$, $r_2$) being suitably chosen so as to allow for said elastic insert (15) to snap fit into said groove (16) by applying a controlled axial biasing force.

3. A mounting system as set forth in claim 1, wherein said elastically flexible portion (15b) comprises a radially outer portion of truncated cone shape diverging in the axial direction towards the outside of the bearing.

4. A mounting system as act forth in claim 1, wherein said insert (15) is locked against said outer face (10a) by a sealing insert (17) being part of a device (18) for sealing the outer face of the bearing.

5. A mounting system as set forth in claim 1, wherein said elastic insert (15) is integrally formed with an insert of a device (18) for sealing the outer face of the bearing.

6. A mounting system as set forth in claim 1, wherein the insert (15) is a separate element not fastened to the bearing, and located adjacent to said face (10a) of the outer race.

7. A mounting system as set forth in claim 1. wherein said flexible portion (15b) of the insert (15) comprises a crown of radial elastic tongues (19).

8. A mounting system as set forth in claim 7, wherein the insert (15) comprises a plurality of radial elastic tongues (19) having a shape copying that of said groove (16) and axially protruding from the suspension standard (12).

9. A mounting system as act forth in claim 1, wherein said annular insert (15) is formed integrally with a disc-like cover (21) for covering a brake member (22).

10. A mounting system as set forth in claim 1, wherein said annular insert (15) is of spring steel.

11. A system for mounting a wheel hub bearing unit into a cylindrical seat (11) obtained in the suspension standard (12) of a vehicle, wherein an axially outer circumferential groove (16) is obtained in said cylindrical seat (11), and proximate to the axially outer side (10a) of the outer race (10) of the bearing there is provided an elastic insert (15) of substantially annular shape having at least a radial portion (15a) adjacent to said face (10a) and constituting an axial stopping means for said outer race of the bearing, wherein said annular insert (15) is formed integrally with a disc-like cover (21) for covering a brake member (22); and at least an elastically flexible portion (15b) radially protruding from the outer surface of the bearing and adapted to elastically bend and snap fit into said groove (16) when pushing the insert (15) axially into said seat (11) of the suspension standard (12).

12. A mounting system as set forth in claim 11, wherein the radius ($r_1$) of the edge (20) at the entrance of said seat (11) is greater than the radius ($r_2$) of the cylindrical portion of said seat, the difference (x) between said radiuses ($r_1$, $r_2$) being suitably chosen so as to allow for said elastic insert (15) to snap fit into said groove (16) by applying a controlled axial biasing force.

13. A mounting system as set forth in claim 11, wherein said elastically flexible portion (15b) comprises a radially outer portion of truncated cone shape diverging in the axial direction towards the outside of the bearing.

14. A mounting system as set forth in claim 11, wherein the insert (15) is a separate element not fastened to the bearing, and located adjacent to said face (10a) of the outer race.

15. A mounting system as set forth in claim 11, wherein said flexible portion (15b) of the insert (15) comprises a crown of radial elastic tongues (19).

16. A mounting system as set forth in claim 15, wherein the insert (15) comprises a plurality of radial elastic tongues (19) having a shape copying that of said groove (16) and axially protruding from the suspension standard (12).

17. A mounting system as set forth in claim 11, wherein said annular insert (15) is of spring steel.

* * * * *